(12) United States Patent
Sitaraman et al.

(10) Patent No.: US 9,692,691 B1
(45) Date of Patent: Jun. 27, 2017

(54) CONCURRENT FORWARDING PLANE PROGRAMMING FOR MULTI-PROTOCOL LABEL SWITCHED NETWORKS

(71) Applicant: Juniper Networks, Inc., Sunnyvale, CA (US)

(72) Inventors: Harish Sitaraman, Bangalore (IN); Raveendra Torvi, Nashua, NH (US); Yakov Rekhter, New York, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 149 days.

(21) Appl. No.: 14/585,329

(22) Filed: Dec. 30, 2014

(51) Int. Cl.
| | |
|---|---|
| *H04L 12/723* | (2013.01) |
| *H04L 12/913* | (2013.01) |
| *H04L 12/775* | (2013.01) |
| *H04L 12/751* | (2013.01) |
| *H04L 12/707* | (2013.01) |

(52) U.S. Cl.
CPC .............. *H04L 45/50* (2013.01); *H04L 45/24* (2013.01); *H04L 45/507* (2013.01); *H04L 45/58* (2013.01); *H04L 47/724* (2013.01)

(58) Field of Classification Search
CPC ........ H04L 12/5689; H04L 41/0654–41/0672; H04L 45/026; H04L 45/22; H04L 45/24; H04L 45/28; H04L 45/50–45/507; H04L 45/58; H04L 47/70–47/728; H04L 47/825; H04L 65/4069; H04W 28/26
See application file for complete search history.

(56) References Cited

U.S. PATENT DOCUMENTS 7,580,359 B2 *  8/2009  Pirbhai ............... H04L 12/5695
370/237

\* cited by examiner

*Primary Examiner* — Timothy J Weidner
(74) *Attorney, Agent, or Firm* — Shumaker & Sieffert, P.A.

(57) ABSTRACT

In general, techniques are described for configuration of label switched paths in multi-protocol label switched networks. A router comprising a control unit and an interface may be configured to perform the techniques. The control unit may determine a label to bind to the LSP. The interface may transmit a message specifying the label that has been bound to the LSP prior to confirming that the LSP has been successfully configured within the support router to use the bound label.

23 Claims, 7 Drawing Sheets

CONCURRENT FORWARDING PLANE PROGRAMMING FOR MULTI-PROTOCOL LABEL SWITCHED NETWORKS

TECHNICAL FIELD

The disclosure relates to computer networks and, more particularly, to configuring label switched paths within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol. When establishing LSPs using MPLS protocols, such as RSVP-TE, delays may accumulate due to the sequential nature in which LSPs are established within a network, which may hamper scalability of MPLS protocols and use of LSPs to communicate packets within large networks.

SUMMARY

In general, this disclosure describes techniques for configuring label switched paths (LSPs) in multi-protocol label switched (MPLS) networks. The techniques may allow the head-end router (which may refer to the ingress router that admits network traffic into the LSP and as such may be referred to as an "ingress router") to specify that an LSP is to be established concurrently within the MPLS network. The head-end router may generate an RSVP Path message, for example, and include an indicator within the Path message that the LSP is to be established concurrently within transport and egress routers along the LSP rather than be established sequentially in reverse manner from the egress router and transport routers along the LSP. The newly constructed Path message may include, for example, a new flag denoted as the "Immediate Label" flag in an Attributes Flag type-length-value field of the LSP_ATTRIBUTES object included in the Path message. This flag may signal to the transport and egress router that the subsequent Resv message, which associates the label allocated at each router to the LSP, is to be sent prior to or concurrent with programming of a forwarding plane of each of the routers.

For example, the egress router of the LSP, upon receiving the initial Path set up message, may allocate a label for the LSP as is common in MPLS protocols, such as RSVP-TE. Prior to completion of configuring the forwarding plane of the egress router, the egress router may generate an RSVP Resv message communicating the label to be used for the LSP to an upstream router (which may be a transport router or the ingress router intermediately positioned upstream along the LSP). This upstream router may determine whether the associated Path message for the LSP was previously signaled to include an "Immediate Label" flag. Upon determining that the LSP is a concurrently established LSP based on a previously specified "Immediate Label" flag, the upstream router allocates a label for the LSP and may construct and output in the upstream direction an Resv message communicating the label to be used for the LSP to the next upstream router prior to completion of the configuration of the forwarding plane. In this respect, rather than each router along the LSP waiting until its respective forwarding plane is configured before sending an RSVP Resv message upstream, the techniques may provide for concurrent establishment of the LSP within the routers along the LSP. As such, the techniques may potentially reduce delay associated with the standard serial establishment of the LSP within each router in turn.

In one example, a method comprises generating, with an ingress router of a label switched path (LSP), a message for establishing the LSP in accordance with a multi-protocol label switching (MPLS) protocol, the message indicating that a label bound to the LSP by a router along the LSP is to be sent upstream prior to the router confirming that a forwarding plane within the router has been configured to use the bound label to forward network packets. The method also comprises outputting, with the ingress router, the message to initiate establishment of the LSP.

In another example, a router configured as an ingress for a label switched path (LSP), the router comprises a control unit configured to generate a message for establishing the LSP in accordance with a multi-protocol label switching (MPLS) protocol, the message indicating that a label bound to the LSP by a router along the LSP is to be sent upstream prior to the router confirming that a forwarding plane within the router has been configured to use the bound label to forward network packets. The router also comprises at least one interface configured to output the message to initiate establishment of the LSP.

In another example, a method comprises determining, with a support router that is to support a label switched path (LSP), a label to bind to the LSP, and transmitting, with the support router, a message specifying the determined label prior to confirming that the LSP has been successfully configured within the support router to use the bound label.

In another example, a support router configured to support a label switched path (LSP), the support router comprises a control unit configured to determine a label to bind to the LSP, and at least one interface configured to transmit a message specifying the label that has been bound to the LSP prior to confirming that the LSP has been successfully configured within the support router to use the bound label.

In another example, a network system comprises an multi-protocol label switched (MPLS) network configured to operation in accordance with an MPLS protocol. The MPLS network includes an ingress router configured to operate as an ingress to a label switched path (LSP), and a router configured to support the LSP. The ingress router comprises one or more processors configure to generate a message for establishing the LSP in accordance with the MPLS protocol, the message indicating that a label bound to the LSP by a router along the LSP is to be sent upstream prior to the router confirming that a forwarding plane within the router has been configured to use the bound label to forward network packets. The ingress router further includes at least one interface configured to output the message to initiate establishment of the LSP. The router configured to support the LSP comprises one or more processors configured to determine the label to bind to the LSP, and at least one interface configured to transmit a second message, based on the indication in the first message, specifying the label that has been bound to the LSP prior to confirming that the LSP has been successfully configured within the support router to use the bound label.

The details of one or more examples are set forth in the accompanying drawings and the description below. Other features, objects, and advantages will be apparent from the description and drawings, and from the claims.

DETAILED DESCRIPTION

Figure 1:
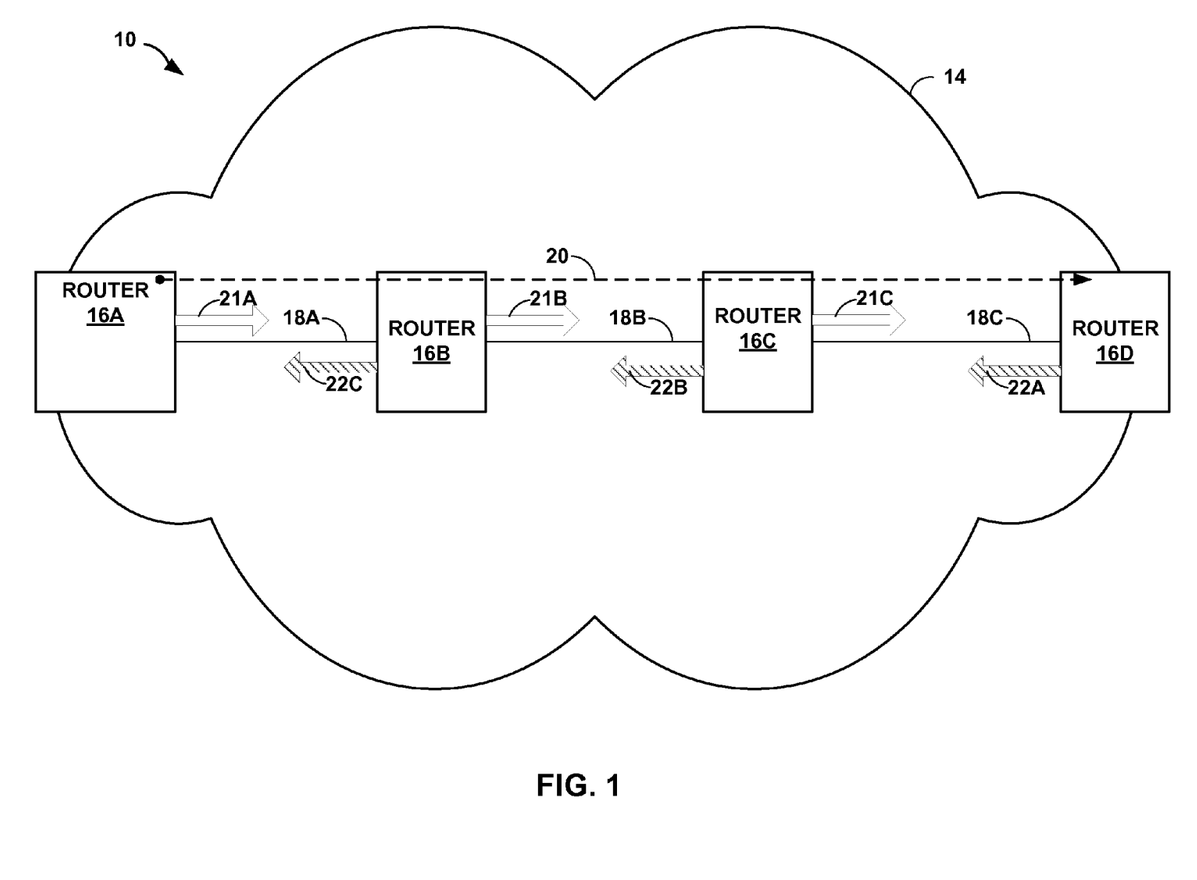
FIG. 1 is a block diagram illustrating an example system in which one or more routers are configured to operate in accordance with various aspects the concurrent label switched path (LSP) configuration techniques described in this disclosure.

FIG. 1 is a block diagram illustrating an example system 10 in which one or more of routers 16A-16D are configured to operate in accordance with various aspects of the concurrent label switched path (LSP) configuration techniques described in this disclosure. Routers 16 represent any network device that routes or otherwise forwards traffic through network 14. Although described for purposes of example with respect to RSVP, the techniques may be applied to any other MPLS protocol in which labels for an LSP are signaled to label switched routers along the LSP.

In the example of FIG. 1, routers 16 may each represent an L3 packet-switching device that exchanges routing information using a routing protocol for Internet protocol (IP) networks, such as link state protocols including the open shortest path first (OSPF) routing protocol and/or the intermediate-system-intermediate-system (IS-IS) routing protocol, describing a link state of each of links 18A-18C of network 14. Routers 16 process the routing information to form a representation (e.g., in the form of a graph data structure) of network 14 and select paths through its representation of the topology of network 14 for reaching all available destinations. Based on the selected paths, each of routers 16 generates forwarding information for programming into respective forwarding planes, e.g., specialized forwarding hardware, of the router. In other words, each of routers 16 reduce the selected paths to so-called "next hops" which identify interfaces of the router to which to forward traffic destined for a particular destination, where the forwarding information includes this list of next hops mapped to the particular interfaces. Each of routers 16 installs this forwarding information in a forwarding plane of the respective router, whereupon the forwarding plane forwards received traffic in accordance with the forwarding information.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

Various services offered by network 14 may be enabled through the establishment of a label switched path (LSP). By using MPLS, an ingress device, such as router 16A, can request a path through a network, i.e., a Label Switched Path (LSP), such as LSP 20 in the example of FIG. 1. An LSP defines a distinct path through the network to carry MPLS packets from an ingress device, i.e., again router 16A in the example of FIG. 1, to an egress device, i.e., router 16D in the example of FIG. 1. Router 16A may admit packets to LSP 20 and, as a result, may be referred as ingress router 16A of LSP 20. After admitting the packets to LSP 20, router 16A may prepend a short label associated with LSP 20 to packets that travel through network 14 via LSP 20. Routers 16B-16D along the path cooperatively perform MPLS operations to forward the MPLS packets along established LSP 20. LSPs may generally be used for a variety of traffic engineering purposes including bandwidth management and quality of service (QoS). A packet may be a discrete formatted set of data and typically includes a header and a payload.

Router 16A may employ one of a variety of protocols to establish LSP 20. For example, router 16A may use a label distribution protocol (LDP) to establish LSP 20. Router 16A may, in some examples, use a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the ISIS protocol or the OSPF protocol.

In the example of FIG. 1, router 16A utilizes RSVP-TE to establish a traffic engineered LSP, which is shown as LSP 20. Router 16A uses RSVP-TE to establish LSP 20 that traverses router 16B and router 16C with an egress of router 16D (which may also be referred to as "egress router 16D"). Although not shown in the example of FIG. 1, additional intermediate transit routers may also be used in support of LSP 20. Likewise, contrary to the example shown in FIG. 1, LSP 20 does not necessarily require four routers 16A-16D, but may be configured using as few as two routers up to any number of routers. Moreover, although described for purposes of example with respect to point-to-point LSP 20, the techniques described herein may readily be applied to point-to-multipoint (P2MP) LSPs.

Additional information regarding RSVP may be found in a request for comments (RFC) 2205, entitled "Resource ReSerVation Protocol (RSVP)—Version 1 Functional Specification," dated September 1997, the entire contents of which is hereby incorporated by reference in its entirety. Additional information regarding RSVP-TE explaining how RSVP may be extended for traffic engineering purposes can be found in RFC 3209, entitled "RSVP-TE: Extensions to RSVP for LSP tunnels," dated December 2001, the entire contents of which is hereby incorporated by reference in its entirety. Additional information regarding how to establish an LSP in accordance with RSVP-TE may be found in RFC 5420, entitled "Encoding of Attributes for MPLS LSP Establishment Using Resource Reservation Protocol Traffic Engineering (RSVP-TE)," dated February 2009, the entire contents of which are hereby incorporated by reference in its entirety. Additional information regarding how information is specified in the various RSVP messages is available in RFC 6510, entitled "Resource Reservation Protocol (RSVP) Message Formats for Label switched Path (LSP) Attributes Objects," dated February 2012, the entire contents of which are hereby incorporated by reference in its entirety. Given the traffic engineering nature of RSVP-TE, RSVP-TE may also provide for a way by which routers 16 may detect failures along the LSP and report such failures to the head-end router, i.e., router 16A in the context of LSP 20 shown in the example of FIG. 1.

As a first example, to initiate establishment of LSP 20 in accordance with conventional RSVP-TE, router 16A may send Path message 21A to router 16B. Path message 21A may represent a request to bind labels to a specific LSP tunnel (i.e., LSP 20 in the example of FIG. 1). Routers 16B may process Path message 21A, generate a new Path message 21B based on the processing of Path message 21A and forward Path message 21B to router 16C. Router 16C may also process Path message 21B generate a new Path message 21C based on the processing of Path message 21B and forward Path message 21BC to router 16D. This type of processing and forwarding of Path messages may continue until it reaches the egress network device for LSP 20, which in the example of FIG. 1 is represented by router 16D. Path message 21A may signal this path from router 16B to router 16C with an egress of router 16D using an EXPLICIT_ROUTE object so that routers 16B and 16C may determine how to forward their respective Path messages 21B and 21C such that Path message 21C reaches router 16D along the appropriate route.

In response to receiving this Path message 21C, router 16D reserves resources for LSP 20, such as bandwidth or other resources required to support a given bandwidth, quality of service (QoS), and the like to provide a few examples. In addition, router 16D allocates a label in response to a LABEL_REQUEST object specified in Path message 21C. Upon allocating the label, router 16D programs a forwarding plane of router 16D, which represents a logical or actual portion of the components within router 16D that is responsible for forwarding packets. Router 16D may include a control plane that is logically or, in some instances, physical separate from the forwarding plane. The control plane of router 16D may execute the routing protocols responsible for maintaining or otherwise determining the topology of the network. The control plane may distill this topology, e.g., stored in the form of a routing information base (RIB), into forwarding information, which is then installed in the forwarding plane, e.g., in the form of a forwarding information base (FIB). The control plane may issue one or more messages to the forwarding plane to install this label within the forwarding plane. The control plane may also verify successful install of this label within the forwarding plane. According to conventional techniques, once the forwarding plane has been successfully programmed, router 16D may generate an Resv message 22A that includes this label and forward this Resv message 22A to the adjacent upstream router along the LSP to be established, i.e., LSP 20 in this example. This adjacent upstream router is shown in the example of FIG. 1 as router 16C.

Router 16C may generally repeat a similar process to router 16D, with the exception of generating a Resv message 21B That is, router 16C may, in response to receiving Resv message 21A, determine whether sufficient resources are available within router 16C to support LSP 20. Router 16C may compare the request for LSP 20 as signaled via Path message 21 and evaluate the request in terms of the currently available resources. Upon successfully reserving resources, router 16C may allocate a label for use in supporting LSP 20 and program a forwarding plane of router 16C with the newly allocated label. According to conventional techniques, a control plane of router 16C may confirm successful programming of the forwarding plane prior to generating Resv message 21B to include the label allocated by router 16C. Router 16C may, after determining that the forwarding plane is successfully programmed, transmit the Resv message 21B to adjacent upstream router 16B along LSP 20. Router 16B may perform substantially similar operations to those described above with respect to router 16C upon receipt of Resv message 21B, outputting a Resv message 21C to adjacent upstream router 16A along LSP 20. Router 16A may, upon receipt of Resv message 21C, update a forwarding plane of router 16A based on Resv message 21C to establish LSP 20 through network 14.

The establishment of LSP 20 according to the conventional techniques described above may however suffer serial delays. That is, each of Resv messages 21A-21C are, in this example, only sent upon successfully confirming the configuration of the forwarding plane of each of routers 21D, 21C and 21B. These delays may increase when routers 16D, 16C and 16B are experiencing high traffic levels or high levels of LSP requests (which may be further exacerbated during link or other failures that require LSPs to be reconfigured to avoid these failures). These delays may be referred to as serial delays that compound at each node (which may generally refer to routers 16) along LSP 20. That is, there is a delay $X_{16D}$ associated with router 16D, a delay $X_{16C}$ associated with router 16C, and a delay $X_{16B}$ associated with router 16B. The delay to establish Total Delay (Total_Delay_X) to establish may be computed in accordance with the following equation:

$$\text{Total\_Delay\_}X = X_{16D} + X_{16C} + X_{16B}$$

In this respect, the Total_Delay_X may be characterized or otherwise referred to as a serial delay.

The serial delay of establishing LSP 20 was considered necessary when there were relatively few ways by which to ensure an LSP was properly established. In other words, when LSPs were first introduced, there were few mechanics by which the ingress router of the LSP was able to ensure that the LSP was properly established in each of the transit routers along the LSP and the egress router of the LSP. As such, the various RFCs noted above with regard to RSVP and RSVP-TE provide for a process by which each node along the LSP ensures that the forwarding plane is properly configured to support the LSP prior to sending the Resv message. Delays may therefore accumulate due to the nature in which LSPs are established. These delays however may hamper scalability of MPLS protocols and potentially prevent use of LSPs to communicate packets, despite the many benefits of using LSPs.

In accordance with the techniques described in this disclosure, head-end router 16A is able to specify that LSP 20 is to be established concurrently within MPLS network 14. In a second example illustrating these techniques, head-end router 16A may generate Path message 21 and construct Path message 21A to specify that LSP 21 is to be established concurrently within transport routers 16B and 16C and egress router 16D along LSP 20 rather than be established sequentially in reverse manner from egress router 16D and then each transport router 16C and 16B along LSP 20. Newly constructed Path message 21A may include, for example, a new flag denoted as the "Immediate Label" flag in an Attributes Flag type-length-value field of the LSP_ATTRIBUTES object included in the Path message. The flag may signal to the transport router 16B that the subsequent Resv messages 22A-22C are to be sent prior to or concurrent with programming of a forwarding plane of each one of routers 16D, 16C and 16B. Moreover, router 16A specifies this flag in Path messages 21A such that each of routers 16B and 16C specify this flag in the respective Path messages 21B and 21C even when one of routers 16B or 16C is not configured to understand the flag. As a result, each of routers 16B-16D may receive a Path message specifying this flag.

For example, egress router 16D of LSP 20, upon receiving Path message 21C, may allocate a label to bind to LSP 20 as is common in MPLS protocols, such as RSVP-TE. Prior to completion of configuring the forwarding plane of egress router 16D, egress router 16D may generate an RSVP Resv message 22A communicating the label bound to LSP 20 to an upstream router 16C. This upstream router 16C may determine whether the associated Path message 21B for LSP 20 was previously signaled to include the above noted "Immediate Label" flag. Upon determining that the LSP is a concurrently established LSP 20 based on a previously signaled "Immediate Label" flag, upstream router 16C may allocate a label to bind to LSP 20 as is common in RSVP-TE. Upstream router 16C, like egress router 16D, may construct and output in the upstream direction Resv message 22B, which specifies the label bound to LSP 20 by router 16C to next upstream router 16B prior to completion of the programming of the forwarding plane of router 16C.

Router 16B may likewise perform in a manner similar to router 16C, allocating a label, constructing Resv message 22C and outputting the Resv message 22C to router 16A prior to completion of the programming of the forwarding plane. In this respect, rather than each router 16D, 16C and 16B along LSP 20 waiting until the forwarding plane is programmed before sending the respective one of Resv messages 22A-22C, the techniques may provide for concurrent establishment of LSP 20 within the routers 16 along LSP 20. As such, the techniques may potentially reduce delay associated with the standard serial establishment of LSP 20 within each of routers 16 in turn.

The time to establish LSP 20 when using the techniques specified in this disclosure may be represented as the total time each of routers 16D, 16C, 16B and 16A uses to allocate a label and send respective Resv messages 22A-22C. This delay to allocate a label and send the respective Resv message 22A for router 16D may be expressed as $Y_{16D}$, where $Y_{16D}$ is less than $X_{16D}$ given that $X_{16D}$ includes the additional delay associated with programming the forwarding plane while $Y_{16D}$ does not include such programming delay. This delay for router 16C may be expressed as $Y_{16C}$, where $Y_{16C}$ is less than $X_{16C}$ for reasons similar to those described above with respect to $Y_{16C}$. This delay for router 16B may be expressed as $Y_{16B}$, where $Y_{16B}$ is less than $X_{16B}$ for reasons similar to those described above with respect to $Y_{16C}$. The Total_Delay_Y, as computed in accordance with the techniques described in this disclosure, may then be specified as followed:

$$\text{Total\_Delay\_}Y = Y_{16D} + Y_{16C} + Y_{16B}$$

This Total_Delay_Y may be less than the Total_Delay_X given that $Y_{16D}$ is less than $X_{16D}$, $Y_{16C}$ is less than $X_{16C}$, and $Y_{16B}$ is less than $X_{16B}$. Accordingly, by using concurrent configuration of LSP 20, the techniques may facilitate more efficient signaling of LSPs within MPLS networks.

As noted above however, concurrent establishment of LSP 20 within the supporting routers (which may represent another way to refer to routers 16 that support LSP 20) may result in a fragmented LSP. A fragmented LSP may refer to an LSP that is not properly installed in the forwarding plane of all of the routers supporting the LSP. Attempting to transmit packets via the fragmented LSP may result in dropped traffic. As such, the techniques may provide for a way by which to ensure that an LSP is not fragmented by leveraging recently developed mechanisms for verifying the viability of the LSP within the MPLS network. For example, the techniques may leverage what is commonly referred to an LSP ping mechanism as described in RFC 4379, entitled "Detecting Multi-Protocol Label Switching (MPLS) Data Plane Failures," dated February 2006, the entire contents of which are hereby incorporated by reference in its entirety.

Accordingly, the techniques may enable ingress router 16A to generate a message, such as Path message 21A, for establishing LSP 20 in accordance with a multi-protocol label switching (MPLS) protocol and including an indicator or other mechanism to request that LSP 20 be established by routers 16B-16D in a concurrent manner. As noted above, router 16A may construct message 21A to include an indicator that any label bound to LSP 20 by a support router along LSP 20 (e.g., one of routers 16D, 16C and 16D) is to be forwarding upstream by the allocating router without waiting to confirm that the router's forwarding plane has been fully configured to forward traffic using the bound label. Router 16A transmit message 21A to router 16B to initiate the establishment of LSP 20.

Downstream support routers, such as router 16B or 16C, may, likewise construct Path messages 21B and 21C, forwarding the Path message 21B and 21C in the downstream direction until the Path message 21C is received by egress router 16D. In the reverse direction, router 16D determines a label to bind to LSP 20 and outputs Resv message 22A advertising the allocated label. Upon receiving Resv message 22A from downstream router 16D, router 16C similarly allocates a label and advertises the label to upstream router 16B. This process continues until router 16B has advertised a respective label to router 16A via Resv message 22C. In each of the cases, router 16B-16D along LSP 20 may transmit its respective Resv message 22 specifying the label that has been bound to LSP 20 prior to confirming that the routers forwarding plane has been configured to forward traffic using the label.

Figure 2:
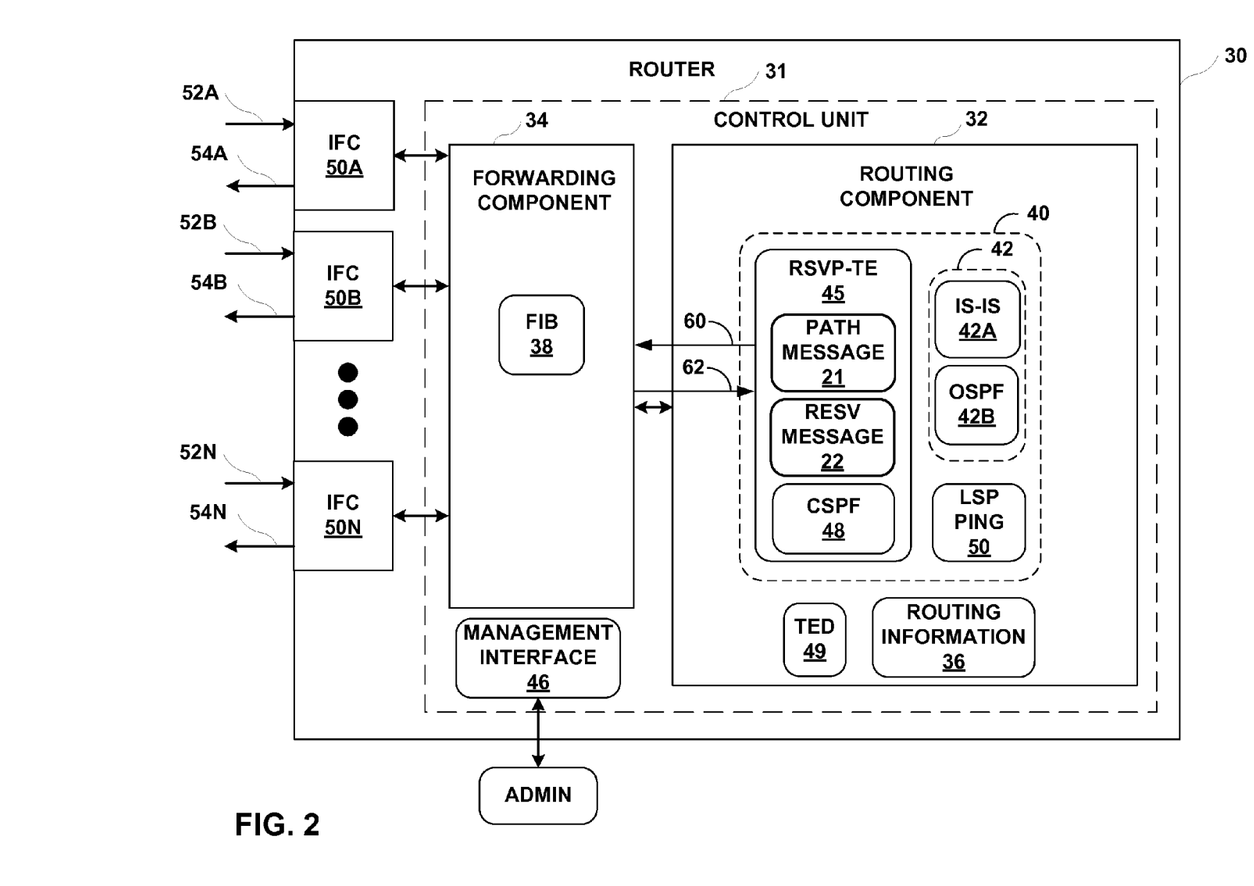
FIG. 2 is a block diagram illustrating an exemplary embodiment of a router that may perform various aspects of the techniques described in this disclosure.

FIG. 2 is a block diagram illustrating an exemplary embodiment of a router 30 that may perform various aspects of the techniques described in this disclosure. Router 30 may represent any one of routers 16 shown in the example of FIG. 1 and, for purposes of describing various aspects of the techniques described in this disclosure, may be assumed to represent ingress router 16A and one or more of support routers 16B-16D. In this example, router 30 includes a control unit 31 that comprises a routing component 32 and a forwarding component 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. Routing component 32 may also be referred to as "control plane 32" in that routing component 32 provides an operating environment in which control plane protocols 40 and other control plane operations may be performed. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 30 is connected. In particular, IGPs 42 update routing information 36 to accurately reflect the topology of the network and other entities. Router 30 may include other example routing protocols such as Border Gateway Protocol (BGP) to provide one example.

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of PLR router 30 can be found in U.S. Pat. No. 8,339,939, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers.

To illustrate, assume that router 30 may represent ingress router 16A shown in the example of FIG. 1. RSVP-TE 45 of ingress router 16A may initiate CSPF process 48, which may compute a path through routers 16A-16B-16C-16D based on traffic engineering database 49 and router information 36. RSVP-TE 45 may signal this path as LSP 20 using Path message 21 as shown in the example of FIG. 2, which may represent Path message 21A shown in the example of FIG. 1. RSVP-TE 45 may generate this Path message in accordance with the RSVP-TE protocol. RSVP-TE 45 may further include within the message an indication that a label bound to LSP 20 by support routers 16B-16D along LSP 20 is to be sent prior to confirming that LSP 20 has been programmed within a forwarding component (which may refer, as one example, to a forwarding plane) of support routers 16B-16D to use the bound label. RSVP-TE 45 may then send this Path message 21A via forwarding components 34 and an appropriate one of IFCs 50 to support router 16B.

This message may effectively enable, as noted above, the at least partially concurrent forwarding plane programming of routers 16A-16D for RSVT-TE LSP 20 (which may also be referred to as a "TE LSP 20"). An administrator ("admin") may interface with a management interface 46 executed by control unit 31 of router 16A to, when specifying that LSP 20 is to be established, indicate that LSP is to occur "immediately." The term "immediately" may loosely refer to the preference for transmission of the Resv message to occur nearly immediately upon determining the label for LSP 20 although no specific time frames are specified by which such transmission may occur other than prior to confirming successful configuration of the forwarding plane for LSP 20 to use the determined label. Management interface 46 may represent a command line interface (CLI), graphical user interface (GUI), a combination of the CLI and GUI or any other interface by which such LSP configuration information may be entered. Moreover, while described as being directly entered by an admin, the techniques may be performed with respect to management systems that provide a common device by which the admin may interface with a number of different routers, a controlling entity such as those present in software defined networks (SDNs) or any other device or operator of the network.

Assuming that router 30 may now represent support router 16B (and that router 16B is substantially similar to router 16A given that router 30 may represent both ingress router 16A and support router 16A), support router 16B may receive Path message 21A indicating that the label bound to LSP 20 is to be sent prior to confirming that LSP 20 has been configured within the forwarding plane to use the bound label. Support router 16B may then update routing information 36 to reflect that LSP 20 is to be configured such that, after determining the label for LSP 20 in response to Resv message 22B and prior to confirming successful programming of the forwarding plane (i.e., forwarding component 34, more specifically FIB 38, of forwarding component 34 in the example of FIG. 2), the label for LSP 20 is sent to ingress router 16A.

After updating routing information 36 to reflect this "immediate" LSP configuration, router 16B may construct Path message 21B to include the flag specified first in Path message 21A. Router 16B may then transmit this Path message 21B to support router 16C. Support router 16C may receive Path message 21B and, assuming router 30 shown in the example of FIG. 2 now represents router 16C, may update routing information 36 to reflect the "immediate" LSP configuration similar to that described above with respect to router 16B. Support router 16C may then construct Path message 21C to include the flag specified in Path message 21B. Support router 16C may then transmit Path message 21C to support router 16D, which may also be denoted as egress router 16D given that router 16D acts as the egress router for LSP 20. Support router 16D may receive Path message 21C and, assuming router 30 shown in the example of FIG. 2 now represents router 16D, may update routing information 36 to reflect the "immediate" LSP configuration similar to that described above with respect to routers 16B and 16C.

Given that router 16D is also the egress router for LSP 20, router 16D may, in addition to updating routing information 36 to reflect the "immediate" LSP configuration for LSP 20, invoke RSVP-TE 45 to generate Resv message 22A specifying a label that router 16C is to use when transmitting network traffic (which may refer to one or more packets) along LSP 20 to router 16D. RSVP-TE 45 may analyze a label space maintained for binding to LSPs and select a unique label (within the context of the routing instance executed by router 16D that supports LSP 20) to be bound to LSP 20. RSVP-TE 45 may determine, based on routing information 36, that this bound label is to be distributed along the path established for LSP 20 (i.e., the path of router 16D-to-router 16C-to-router 16B-to-router 16A) prior to confirming that the label has been configured within FIB 38 of forwarding component 34 (which may refer to, as one example, the forwarding plane) prior to confirming that the determined label has been successfully installed within FIB 38 of forwarding component 34 (which again may be generally referred to as the forwarding plane). As a result, RSVP-TE 45 may generate Resv message 22A (which is shown as "Resv message 22" in the example of FIG. 2) specifying the label bound to LSP 20 and transmit Resv message 22A prior to confirming that the label has been successfully configured within FIB 38 of forwarding component 34.

In some examples, RSVP-TE 45 may transmit Resv message 22A prior to interfacing with forwarding component 34 to configure the determined label within FIB 38. That is, RSVP-TE 45 may send forwarding plane configuration messages 60 to forwarding component 34 specifying that the determined label is to be added to FIB 38 for LSP 20. In these examples, RSVP-TE 45 may send Resv message 22A prior to sending these internal forwarding plane configuration messages 60. In other examples, RSVP-TE 45 may transmit Resv message 22A after interfacing with forwarding component 34 to configure the determined label within FIB 38 (e.g., after sending internal forwarding plane configuration messages 60) but prior to forwarding component 34 confirming that FIB 38 has been successfully updated to include the determined label to be used for LSP 20. Forwarding component 34 may confirm that LSP 20 has been successfully installed via configuration acknowledgement (ACK) messages 62. In these examples, RSVP-TE 45 may transmit Resv message 22A after sending the forwarding plane configuration message 60 but prior to forwarding component 34 transmitting forwarding plane configuration ACK messages 62 in response to the configuration message 62.

More information regarding the configuration of the forwarding component 34 is provided in U.S. patent application Ser. No. 13/436,896, entitled "REDUCED TRAFFIC LOSS FOR BORDER GATEWAY PROTOCOL SESSIONS IN MULTI-HOMED NETWORK CONNECTIONS," filed Mar. 31, 2012, the entire contents of which are hereby incorporated by reference. Although the foregoing incorporated U.S. patent application Ser. No. 13/436,896 is related to the border gateway protocol (BGP), the various processes related therein may be applied to RSVP-TE or any form of forwarding plane programming.

Assuming now that router 30 represents support router 16C, RSVP-TE 45 executed by router 16C may receive the Resv message 22A (which again may generally be shown in the example of FIG. 2 as Resv message 22). Meanwhile, RSVP-TE 45 of router 16D may either interface with the forwarding plane to install the determined label (e.g., via configuration message 60) and receive confirmation message 62 from the forwarding plane that the label was successfully programmed into FIB 38 or receive confirmation message 62 that the determined label was successfully programmed into FIB 38. The configuration and confirmation operations by RSVP-TE 45 of router 16D may occur concurrent to router 16C invoking RSVP-TE 45 to determine the label that is to be bound with LSP 20 similar to RSVP-TE 45 of router 16D. RSVP-TE 45 of router 16C may then generate Resv message 22B to include the determined label. RSVP-TE 45 of router 16C may determine that this Resv message 22B is to be transmitted prior to confirming that forwarding plane has been successfully programmed or otherwise configured with the determined label (and the label specified by router 16D in Resv message 22A) in support of LSP 20. RSVP-TE 45 of router 16C may then transmit Resv message 22B via forwarding component 34 and one of IFCs 50 to support router 16B. Support router 16B may perform operations substantially similar to support router 16C to generate and transmit Resv message 22C to ingress router 16A.

RSVP-TE 45 executed by the control plane of ingress router 16A (assuming again that router 30 represents router 16A) may receive Resv message 22C and program the forwarding plane with the label specified by router 16B in Resv message 22C. Given that router 16A is the ingress router to LSP 20, router 16A may not determine a label to associate with LSP 20, but instead program the forwarding plane to push the label specified by router 16B in the Resv message 22C onto the label stack of any traffic admitted to LSP 20. Router 16A may still perform this forwarding plane programming concurrent to the programming of the forwarding planes by one or more of support routers 16B-16D, thereby facilitating the scalability of establishing RSVP-TE LSPs or any other type of LSPs susceptible to serialized programming delays.

However, as noted above, ingress router 16A may not, after programming the forwarding plane with the label specified by router 16B in the Resv message 22C, begin admitting traffic to LSP 20 given that one or more of support routers 16B-16D may not have finished programming their respective forwarding planes. As a result, ingress router 16B may invoke LSP ping 50, which may represent a unit configured to perform the LSP ping protocol set forth in the above incorporated RFC 4379. Although described with respect to the LSP ping protocol, various other ways may be used by which to confirm successful configuration of LSP 20. One alternative that may be used is described in U.S. patent application Ser. No. 14/328,669, entitled "SYSTEM AND METHOD FOR VERIFYING TH FUNCTIONALITY OF NETWORK PATHS," filed 10 Jul. 2014, the entire contents of which are hereby incorporated by reference in its entirety.

LSP ping 50 may ensure that the data plane (or, in other words, the forwarding plane) is operational. Each of support routers 16B-16D may execute a similar instance of this LSP ping operation so that data plane failures along LSP 20 may be detected prior to transmitting any traffic via LSP 20. When ingress router 16A detects a failure via LSP ping 50, ingress router 16A may wait a determined amount of time before once again invoking LSP ping 50 to identify any data plane failures. This process may repeat until LSP ping 50 of ingress router 16A no longer detects any failures. Upon detecting no failures, the forwarding plane of router 16A may begin admitting traffic to LSP 20 and forwarding this traffic via LSP 20. In this respect, ingress router 16A may confirm that LSP 20 has been successfully configured within support routers 16B-16D prior to sending network traffic via LSP 20.

Figure 3A:
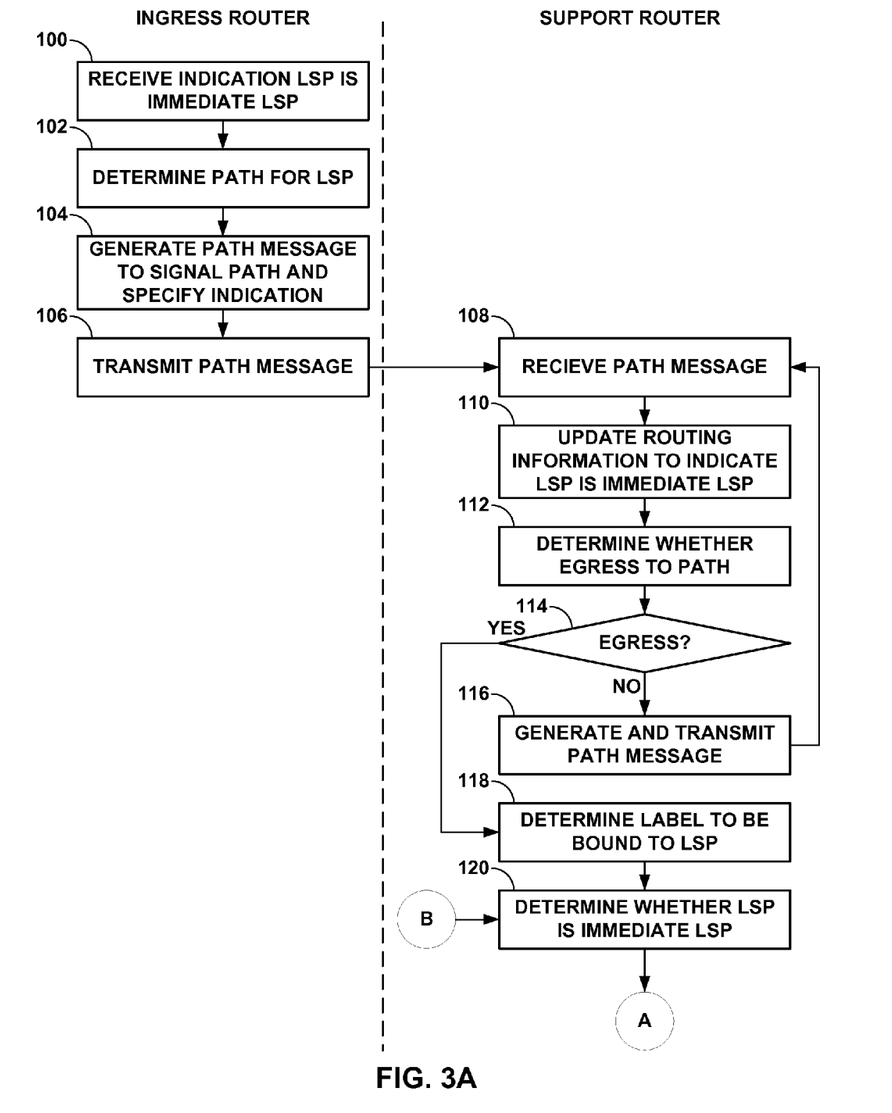
FIGS. 3A-3C is a flowchart illustrating example operation of network devices in accordance with various aspects of the techniques of this disclosure.
Figure 3B:
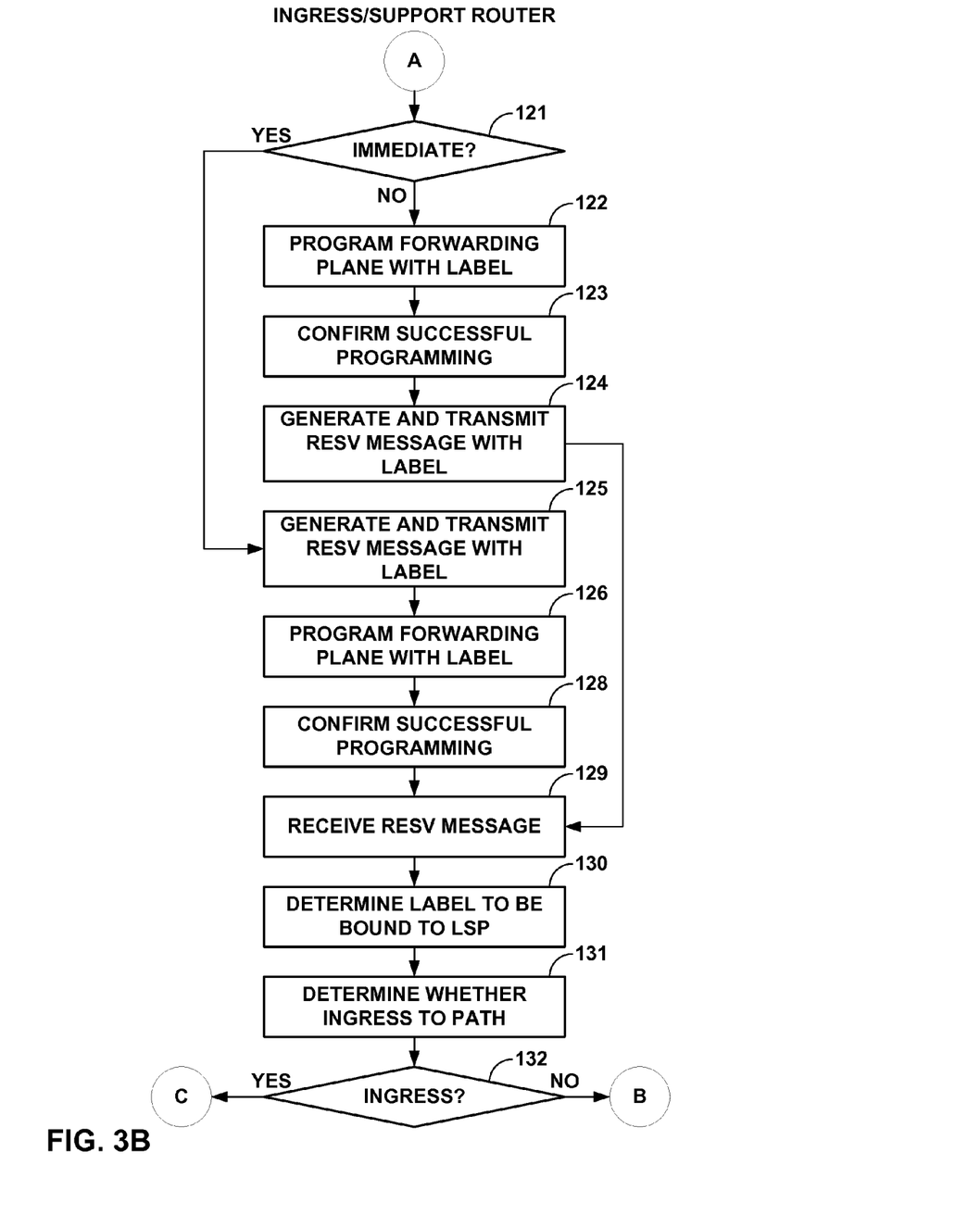
Figure 3C:
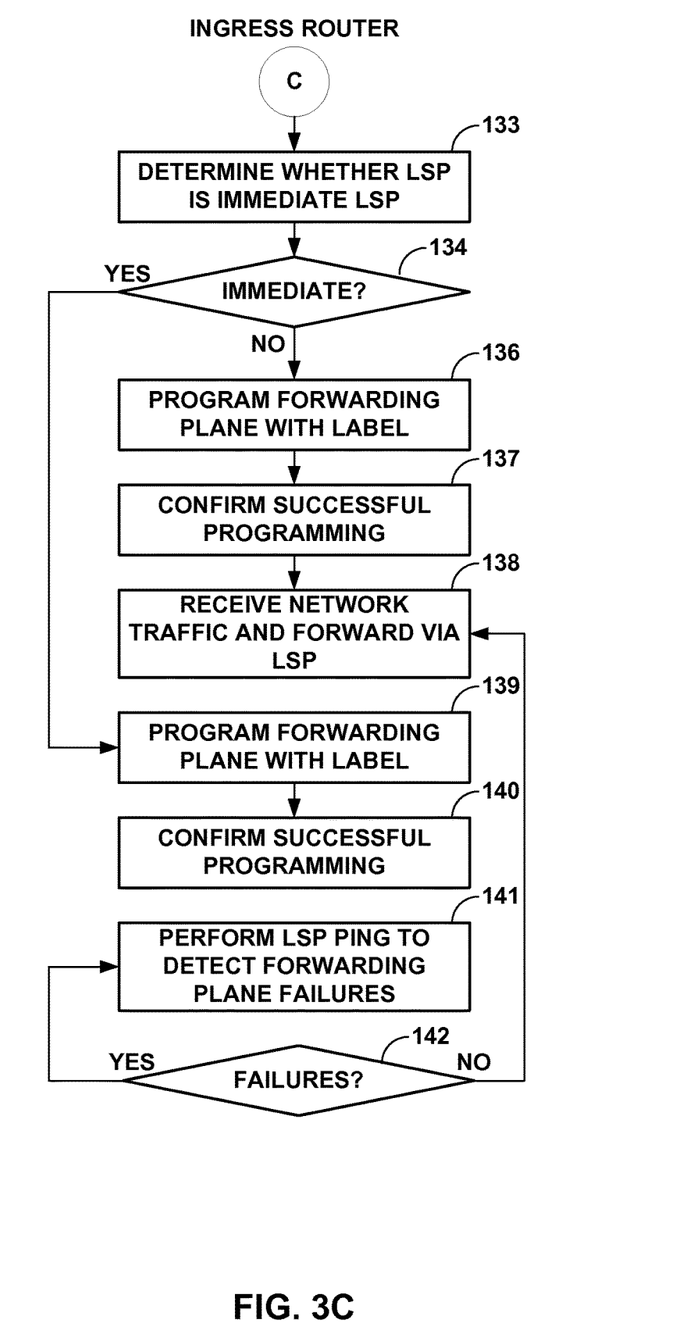

FIGS. 3A-3C is a flowchart illustrating example operation of network devices, such as routers 16 shown in the example of FIG. 1, in accordance with various aspects of the techniques of this disclosure. Initially, ingress router 16A may via a management interface, such as management interface 46 shown in the example of FIG. 2, receive an indication of whether or not an LSP, such as LSP 20 shown in the example of FIG. 1, is a so-called "immediate" LSP, which may refer to an LSP that is subject to the above described "immediate" LSP configuration (100). In this example, it is assumed that an indication is received that LSP 20 is to be an "immediate" LSP. In some examples, the administrator or other network operator may indicate that all LSPs (possibly within specific domains or routing contexts) are to "immediate" LSPs, in which case individual indications for each LSP may not be received.

In any event, RSVP-TE 45 of ingress router 16A may, in order to establish LSP 20, invoke CSPF 48 to determine the above noted path for LSP 20 (102). RSVP-TE 45 of ingress router 45 may, after determining the path, generate Path message 21A to signal the determined path and specify the indication of whether LSP 20 is to be configured as an "immediate" LSP (104). RSVP-TE 45 may then transmit Path message 21A to support router 21B (which may also be referred to as an adjacent router along the determined path for LSP 20) (106).

Support router 16B may receive Path message 21A indicating that the label bound to LSP 20 is to be sent prior to confirming that LSP 20 has been configured within the forwarding plane to use the bound label (108). Support router 16B may then update routing information 36 to reflect that LSP 20 is to be configured as an "immediate" LSP (110). After updating routing information 36 to reflect this "immediate" LSP configuration, support router 16B may determine whether, based on the path specified in Path message 21A, whether support router 16B is an egress for LSP 20 (112). When determined not to be the egress for LSP 20 ("NO" 114), support router 16B may generate Path message 21B and transmit Path message 21B to the next support router along the path, i.e., support router 16C in the example of FIG. 1 (116). Support router 16C may perform substantially similar operations to those described above with respect to support router 16B (108-116). As a result, support router 16D may receive Path message 21C and perform similar operations described above with respect to support routers 16B and 16C, except that support router 16D may determine that support router 16D is the egress for LSP 20 (108-112, "YES" 114).

Given that router 16D is also the egress router for LSP 20, router 16D may invoke RSVP-TE 45 to generate Resv message 22A specifying a label that router 16C is to use when transmitting network traffic (which may refer to one or more packets) along LSP 20 to router 16D. RSVP-TE 45 may analyze a label space maintained for binding to LSPs and determine a label to be bound to LSP 20 (118). RSVP-TE 45 may determine, based on routing information 36, that this bound label is to be distributed along the path established for LSP 20 (i.e., the path of router 16D-to-router 16C-to-router 16B-to-router 16A) prior to confirming that the label has been configured within FIB 38 of forwarding component 34 (which may generally be referred to as the forwarding plane) prior to confirming that the determined label has been successfully installed within FIB 38 of forwarding component 34 (which again may be generally referred to as the forwarding plane). That is, RSVP-TE 45 of router 16D may determine whether LSP 20 is an "immediate" LSP based on the routing information 38 corresponding to LSP 20 (120).

Upon determining that LSP 20 is not an "immediate" LSP ("NO" 121), RSVP-TE 45 of router 16D may program the forwarding plane with the label, confirm successful programming, and only after confirming successful programming, transmit Resv message 22A (and potentially also only generate Resv message 22A upon confirming successful programming) to support router 16C (122-124). However, assuming that LSP 20 is an "immediate" LSP ("YES" 121), RSVP-TE 45 of router 16D may generate and transmit Resv message 22A with the bound label (125) prior to one or both of programming the forwarding plane with the bound label and confirming successful programming of the forwarding plane (126, 127). Support router 16C may receive Resv message 22A (129), and determine a label to be bound to LSP 20 based on Resv message 22A (130). Support router 16C may determine whether support router 16C in the ingress for LSP 20 (131). In this instance, support router 16C determines that it is not the ingress ("NO" 132). As a result, support router 16C determines whether LSP 20 is an "immediate" LSP (120), whereupon router 16C then operates in a manner similar to that described above with respect to router 16D (121-128). Support router 16B may operate in a manner substantially similar to that described above with respect to support router 16C (129-132, 120, 121-128), where support router 16B may send Resv message 22C to ingress router 16A.

RSVP-TE 45 of ingress router 16A may receive Resv message 22C, determine a label to be bound to LSP 20 (e.g., the label specified by router 16B in Resv message 22C) and determine whether router 16A is the ingress to LSP 20 (129-131). RSVP-TE 45 of router 16A determines, in this example, that router 16A is in the ingress for LSP 20 ("YES" 132), and then determines whether LSP 20 is an "immediate" LSP (133). When determined not to be an "immediate" LSP ("NO" 134), RSVP-TE 45 of ingress router 16A may program the forwarding plane with the label, confirm successful programming of the forwarding plane, receive network traffic and forward this network traffic via LSP 20 without performing any LSP ping operations or otherwise invoking LSP ping 50 (136-138).

When determined to be an "immediate" LSP ("YES" 134), RSVP-TE 45 of ingress router 16A may program the forwarding plane with the label, confirm successful programming of the forwarding component 34 of router 16A and then invoke LSP ping 50 to perform an LSP ping to detect forwarding plane failures of router 16B-16D (139-141). When ingress router 16A detects a failure via LSP ping 50 ("YES" 142), ingress router 16A may wait a determined amount of time before once again invoking LSP ping 50 to identify any data plane failures (141). This process may repeat until LSP ping 50 of ingress router 16A no longer detects any failures ("YES" 142, 141). Upon detecting no failures ("NO" 142), the forwarding plane of router 16A may begin admitting traffic to LSP 20 and forwarding this traffic via LSP 20 (138).

Figure 4:
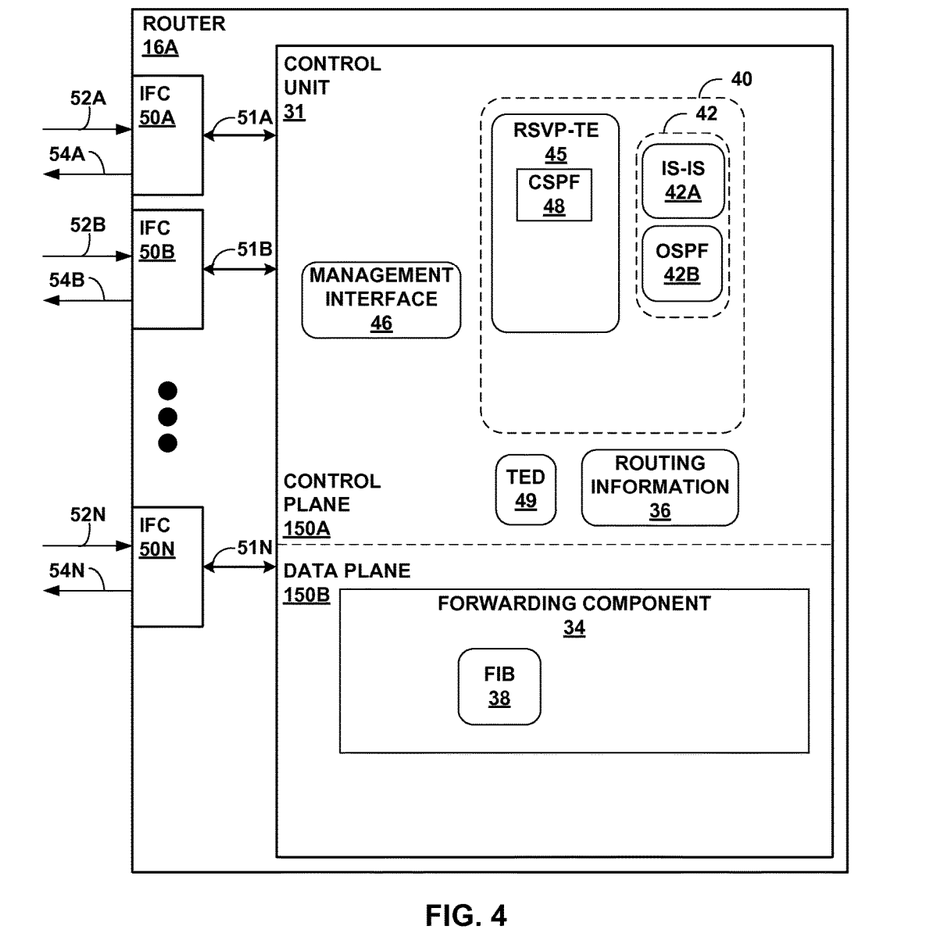
FIG. 4 is a block diagram illustrating another example of network devices configured to operate in accordance with techniques described in this disclosure.

FIG. 4 is a block diagram illustrating another example of network devices 16 configured to operate in accordance with techniques described in this disclosure. Each of routers 16 includes a control unit 31 and interface cards 50A-50N ("IFCs 50") coupled to control unit 30 via internal links 51A-51N. Control unit 31 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 31 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 31 is divided into two logical or physical "planes" to include a first control or routing plane 150A ("control plane 150A") and a second data or forwarding plane 150B ("data plane 150B"). That is, control unit 31 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 150A of control unit 31 executes the routing functionality of router 16A, including routing protocol modules 40 and management interface 46 along with providing access to TED 49 and routing information 36. In this respect, control plane 150A represents hardware or a combination of hardware and software of control unit 31 that implements routing protocols by which routing information stored in routing information 36 (which may also be referred to as a "routing information base 36" or "RIB 36") may be determined. RIB 36 may include information defining a topology of a network, such as network 14 of FIG. 1. Control plane 150A may resolve the topology defined by routing information in RIB 36 to select or determine one or more routes through the network. Control plane 150A may then update data plane 150B with these routes, where data plane 150B maintains these routes as forwarding information base 38 ("FIB 38"). Forwarding or data plane 150B represents hardware or a combination of hardware and software of control unit 31 that forwards network traffic in accordance with FIB 38.

Figure 5:
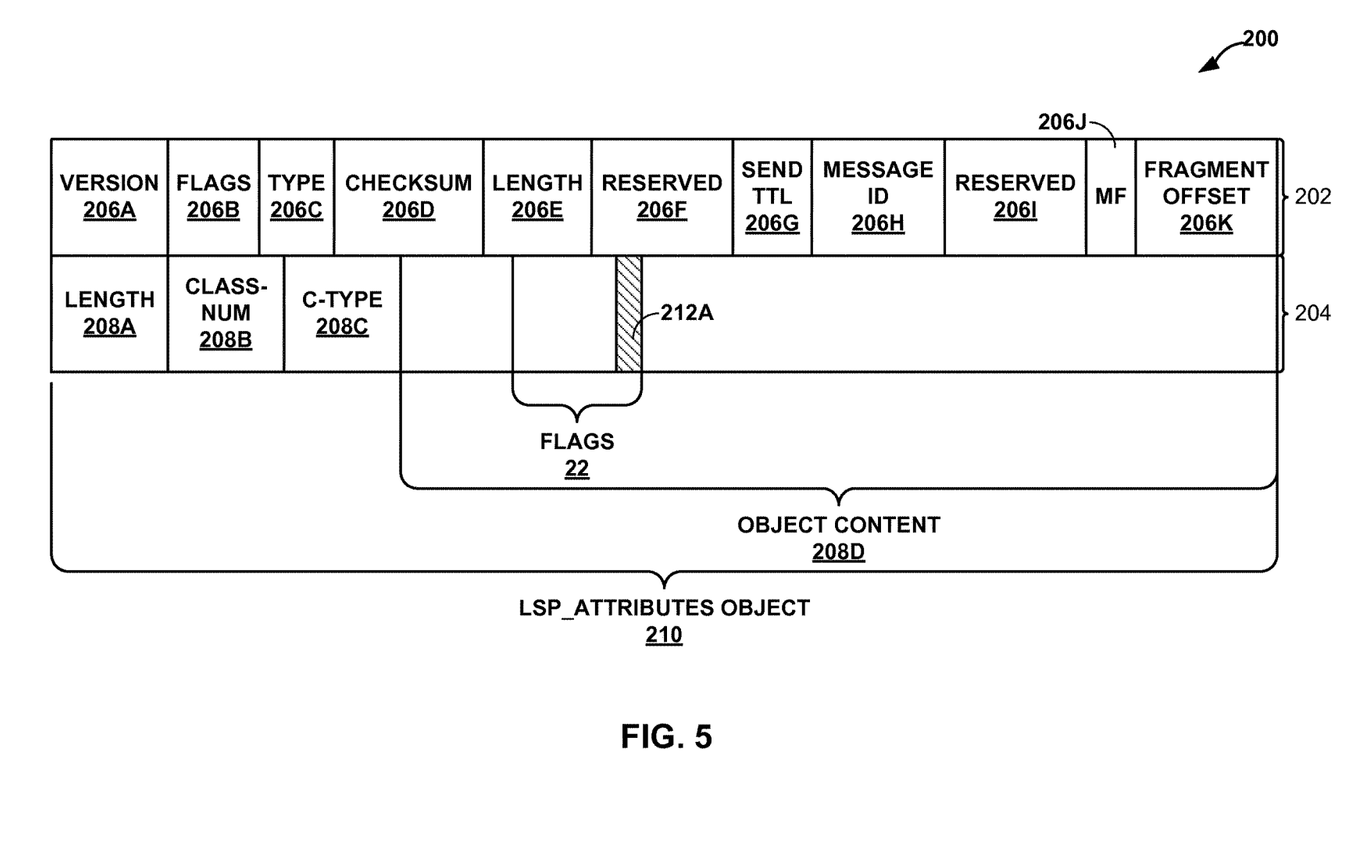
FIG. 5 is a diagram illustrating a multi-protocol label switching (MPLS) protocol message formed in accordance with various aspects of the techniques described in this disclosure.

FIG. 5 is a diagram illustrating a multi-protocol label switching (MPLS) protocol message 200 formed in accordance with various aspects of the techniques described in this disclosure. Message 200 may represent one example of Path message 21 described above.

As shown in the example of FIG. 5, message 200 includes a header portion 202 and an object portion 204. Header portion 202 includes a number of fields 206A-206K, each of which is described in more detail in the above incorporated RFC 2205. Object portion 204 may include one or more objects. In the example of FIG. 5, only a single object is shown for ease of illustration purposes. Although only a single object is shown, the techniques should not be limited to the example of FIG. 5 but may be extended to instances where Path messages or other MPLS protocol messages may include more than one object.

Object portion 204 of message 200 may define objects in the form of type-length-value fields, where length field 208A may identify the length, a combination of class-num field 208B and c-type field 208C may identify the type and object contents field 208D may identify the value. Via these fields 208A-208C, RSVP-TE 45 may specify a particular type of object in the form of an LSP_ATTRIBUTES object 210. This object 210 is defined in more detail in the above incorporated RFC 5420, but may generally be an optional field where, if a support router does not support the object, the support router is to forward the object 210 unexamined and unchanged. Within the object content 208D, RSVP-TE 45 may specify one or more flags 212, one of which may comprise the "immediate label" flag 212A described above in more detail for specifying that the LSP is subject to the so-called "immediate" LSP configuration.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
generating, with an ingress router of a label switched path (LSP) that admits network packets into the LSP and forwards the network packets toward an egress router of the LSP, a path message for establishing the LSP in accordance with a multi-protocol label switching (MPLS) protocol, the path message indicating that a label allocated and bound to the LSP by a router positioned along the LSP between the ingress router and the egress router of the LSP is to be sent upstream by the router toward the ingress router prior to the router confirming that a forwarding plane within the router has been configured to use the bound label to forward the network packets; and
outputting, with the ingress router and toward the egress router, the path message to initiate establishment of the LSP.

2. The method of claim 1,
wherein the router along the LSP includes a control plane configured to execute an instance of the MPLS protocol, and
wherein the path message indicates that the label bound to the LSP by the instance of the MPLS protocol is to be sent upstream toward the ingress router prior to the instance of the MPLS protocol confirming that the LSP has been configured within the forwarding plane to use the bound label.

3. The method of claim 1, wherein generating the path message comprises generating a Path message for establishing the LSP in accordance with a Resource ReSerVation (RSVP) protocol with traffic engineering extensions (RSVP-TE).

4. The method of claim 3, wherein generating the path message comprises generating the Path message to include an LSP_ATTRIBUTES object comprising an Attribute Flags type-length-value (TLV) field specifying a flag indicating that the label bound to the LSP by the router along the LSP is to be sent upstream toward the ingress router prior to confirming that the LSP has been configured within the router along the LSP to use the bound label.

5. The method of claim 1, further comprising:
receiving a Resv message specifying the label bound to the LSP by the router along the LSP in accordance with a Resource ReSerVation (RSVP) protocol with traffic engineering extensions (RSVP-TE);
establishing, within the ingress router, the LSP based on the Resv message;
confirming that the LSP has been successfully configured within the router along the LSP prior to sending network traffic via the LSP.

6. The method of claim 5, wherein confirming that the LSP has been successfully configured within the router along the LSP comprises performing an LSP ping operation with respect to the router along the LSP.

7. An ingress router configured as an ingress for a label switched path (LSP) and to admit network packets into the LSP, the router comprising:
a control unit configured to generate a path message for establishing the LSP from the ingress router to an egress router of the LSP in accordance with a multi-protocol label switching (MPLS) protocol, the path message indicating that a label allocated and bound to the LSP by a router positioned along the LSP between the ingress router and the egress router of the LSP is to be sent upstream by the router toward the ingress router prior to the router confirming that a forwarding plane within the router has been configured to use the bound label to forward the network packets; and
at least one interface configured to output, toward the egress router, the path message to initiate establishment of the LSP.

8. The ingress router of claim 7,
wherein the router along the LSP includes a control plane configured to execute an instance of the MPLS protocol, and
wherein the path message indicates that the label bound to the LSP by the instance of the MPLS protocol is to be sent upstream toward the egress router prior to the instance of the MPLS protocol confirming that the LSP has been configured within the forwarding plane to use the bound label.

9. The ingress router of claim 7, wherein the control unit is configured to generate a Path message for establishing the LSP in accordance with a Resource ReSerVation (RSVP) protocol with traffic engineering extensions (RSVP-TE).

10. The ingress router of claim 9, wherein the control unit is configured to generate the Path message to include an LSP_ATTRIBUTES object comprising an Attribute Flags type-length-value (TLV) field specifying a flag indicating that the label bound to the LSP by the router along the LSP is to be sent prior to confirming that the LSP has been configured within the router along the LSP to use the bound label.

11. The ingress router of claim 7,
wherein the at least one interface is further configured to receive a Resv message specifying the label bound to the LSP by the router along the LSP in accordance with a Resource ReSerVation (RSVP) protocol with traffic engineering extensions (RSVP-TE), and
wherein the control unit is further configured to establish, within the ingress router, the LSP based on the Resv message, and confirm that the LSP has been successfully configured within the router along the LSP prior to sending network traffic via the LSP.

12. The ingress router of claim 11, wherein the control unit is configured to perform an LSP ping operation with respect to the LSP to confirm that the LSP has been successfully configured within the router along the LSP.

13. A method comprising:
determining, with a support router that is to support transport of packets along a label switched path (LSP), a label to bind to the LSP, the support router intermediately positioned downstream from an ingress router of the LSP and upstream from an egress router of the LSP; and transmitting, with the support router and toward the ingress router, a reservation message specifying the determined label prior to confirming that the LSP has been successfully configured within the support router to use the bound label.

14. The method of claim 13,
wherein the support router includes a control plane and a forwarding plane,
wherein the control plane is configured to execute an instance of the MPLS protocol,
wherein determining the label to bind to the LSP comprises determining, with the instance of the MPLS protocol, the label to bind to the LSP, and
wherein the method further comprises generating, with the instance of the MPLS protocol, the reservation message prior to confirming that the LSP has been successfully configured within the forwarding plane of the support router to use the bound label.

15. The method of claim 14, further comprising forwarding, from the control plane to the forwarding plane, a configuration message instructing the forwarding plane to install the label that has been bound to the LSP,
wherein transmitting the reservation message comprises transmitting the reservation message prior to the control plane receiving an acknowledgement message from the forwarding plane indicating that the label specified in the configuration message has been successfully installed within the forwarding plane.

16. The method of claim 13, further comprising receiving a Path message for establishing the LSP in accordance with a Resource ReSerVation (RSVP) protocol with traffic engineering extensions (RSVP-TE), the Path message indicating that the label bound to the LSP by the support router along the LSP is to be sent prior to confirming that the LSP has been configured within the support router to use the bound label,
wherein transmitting the reservation message comprises transmitting a Resv message in accordance with the RSVP-TE protocol prior to confirming that the LSP has been successfully configured within the support router to use the bound label based on the indication in the Path message.

17. The method of claim 15, wherein the Path message includes an LSP_ATTRIBUTES object comprising an Attribute Flags type-length-value (TLV) field specifying a flag indicating that the label bound to the LSP by the support router along the LSP is to be sent prior to confirming that the LSP has been configured within the support router to use the bound label.

18. A support router configured to support a label switched path (LSP), the support router comprising:
a control unit configured to determine a label to bind to the LSP, the support router intermediately positioned downstream from an ingress router of the LSP and upstream from an egress router of the LSP; and
at least one interface configured to transmit a reservation message specifying the label that has been bound to the LSP upstream toward the ingress router prior to confirming that the LSP has been successfully configured within the support router to use the bound label.

19. The support router of claim 18,
wherein the control unit includes a control plane and a forwarding plane, wherein the control plane is configured to execute an instance of the MPLS protocol,
wherein the instance of the MPLS protocol is configured to determine the label to bind to the LSP, and generate the reservation message specifying prior to confirming that the LSP has been successfully configured within the forwarding plane of the support router to use the bound label.

20. The support router of claim 19,
wherein the control plane is further configured to forward, to the forwarding plane, a configuration message instructing the forwarding plane to install the label that has been bound to the LSP,
wherein the at least one interface is configured to transmit the reservation message prior to the control plane receiving an acknowledgement message from the forwarding plane indicating that the label specified in the configuration message has been successfully installed within the forwarding plane.

21. The support router of claim 18, wherein the at least on interface is configured to receive a Path message for establishing the LSP in accordance with a Resource ReSerVation (RSVP) protocol with traffic engineering extensions (RSVP-TE), the Path message indicating that the label bound to the LSP by the support router along the LSP is to be sent prior to confirming that the LSP has been configured within the support router to use the bound label, and transmit a Resv message in accordance with the RSVP-TE protocol prior to confirming that the LSP has been successfully configured within the support router to use the bound label based on the indication in the Path message.

22. The support router of claim 20, wherein the Path message includes an LSP_ATTRIBUTES object comprising an Attribute Flags type-length-value (TLV) field specifying a flag indicating that the label bound to the LSP by the support router along the LSP is to be sent prior to confirming that the LSP has been configured within the support router to use the bound label.

23. A network system comprising:
an multi-protocol label switched (MPLS) network configured to operation in accordance with an MPLS protocol, the MPLS network including:
an ingress router configured to operate as an ingress to a label switched path (LSP) and admit network packets into the LSP and forwards the packets toward an egress router of the LSP, and
a support router configured to support the LSP, the support router intermediate positioned downstream from an ingress router of the LSP and upstream from an egress router of the LSP,
wherein the ingress router comprises:
one or more processors configure to generate a path message for establishing the LSP in accordance with the MPLS protocol, the path message indicating that a label bound to the LSP by one or more of the support router and the egress router is to be sent upstream by the support router toward the ingress router prior to one or more of the support router and the egress router confirming that a forwarding plane within one or more of the support router and the egress router has been configured to use the bound label to forward the network packets; and
at least one interface configured to output the path message to initiate establishment of the LSP, and
wherein the support router configured to support the LSP comprises:

one or more processors configured to determine the label to bind to the LSP, and at least one interface configured to transmit a reservation message, based on the indication in the path message and toward the ingress router, specifying the label that has been bound to the LSP prior to confirming that the LSP has been successfully configured within the support router to use the bound label.

* * * * *